(12) United States Patent
Mori et al.

(10) Patent No.: US 10,027,213 B2
(45) Date of Patent: Jul. 17, 2018

(54) VIBRATION MOTOR

(71) Applicant: Nidec Seimitsu Corporation, Ueda-shi, Nagano-ken (JP)

(72) Inventors: Zendi Mori, Ueda (JP); Takayuki Takeuchi, Ueda (JP)

(73) Assignee: NIDEC SEIMITSU CORPORATION, Nagano (JP)

( * ) Notice: Subject to any disclaimer, the term of this patent is extended or adjusted under 35 U.S.C. 154(b) by 344 days.

(21) Appl. No.: 14/878,085

(22) Filed: Oct. 8, 2015

(65) Prior Publication Data
US 2016/0204685 A1 Jul. 14, 2016

(30) Foreign Application Priority Data
Sep. 30, 2014 (JP) ................................. 2014-200714

(51) Int. Cl.
*H02K 33/00* (2006.01)
*H02K 33/18* (2006.01)

(52) U.S. Cl.
CPC ............. *H02K 33/00* (2013.01); *H02K 33/18* (2013.01)

(58) Field of Classification Search
CPC ............................... H02K 33/00; H02K 33/18
USPC ......................................................... 310/25
See application file for complete search history.

(56) References Cited

U.S. PATENT DOCUMENTS

| 2013/0082546 A1 | 4/2013 | Kim | |
|---|---|---|---|
| 2013/0119787 A1* | 5/2013 | Yu | B06B 1/045 310/25 |
| 2014/0001889 A1* | 1/2014 | Hong | H02K 33/18 310/25 |

(Continued)

FOREIGN PATENT DOCUMENTS

JP  2013-085438 A  5/2013

*Primary Examiner* — Forrest M Phillips
(74) *Attorney, Agent, or Firm* — Keating & Bennett, LLP

(57) ABSTRACT

A vibration motor, comprising a base portion which expands perpendicular to a vertical center axis, a magnet portion which is securely mounted on an upper side of the base portion in a vertical direction, a vibrator portion which is disposed around the magnet portion and vibrates vertically, a cover portion which is fixed to the base portion and covers upper and side portions of the magnet portion and the vibrator portion, an elastic member which is disposed between an upper inner surface of the cover portion and a top portion of the vibrator portion, and a circuit board which is flexible and coupled to a top surface of the base portion and a bottom portion of the vibrator portion, wherein the vibrator portion includes a coil portion which faces the magnet portion in a circumferential direction, and a mass portion which is fixed to the coil portion, the base portion includes a base protrusion which protrudes from the cover portion to a radially outer side, and the circuit board includes a lower terminal portion which protrudes outward from between the cover portion and the base portion in a radial direction and is fixed to a top surface of the base protrusion, an upper terminal portion which is fixed to the lower portion (Continued)

of the vibrator portion and electrically connected to the coil portion, and two leg portions which extend from the lower terminal portion to both sides in the circumferential direction inside the cover portion and connected to the upper terminal portion from both sides in the circumferential direction.

20 Claims, 15 Drawing Sheets

(56) References Cited

U.S. PATENT DOCUMENTS

| | | | | |
|---|---|---|---|---|
| 2014/0070633 A1* | 3/2014 | Kim | ........................ | B06B 1/045 |
| | | | | 310/25 |
| 2014/0103750 A1* | 4/2014 | Ishihara | .................. | H02K 33/16 |
| | | | | 310/25 |
| 2014/0103751 A1* | 4/2014 | Furukawa | ............... | H02K 35/02 |
| | | | | 310/25 |
| 2014/0232211 A1* | 8/2014 | Katada | .................... | H02K 33/00 |
| | | | | 310/25 |
| 2014/0252890 A1* | 9/2014 | Lee | ........................ | H02K 33/16 |
| | | | | 310/25 |
| 2015/0123499 A1* | 5/2015 | Park | ........................ | H02K 33/16 |
| | | | | 310/25 |
| 2015/0214822 A1* | 7/2015 | Kim | ........................ | H02K 33/18 |
| | | | | 310/25 |

* cited by examiner

VIBRATION MOTOR

BACKGROUND OF THE INVENTION

1. Field of the Invention

The present disclosure relates to a vibration motor.

2. Description of the Related Art

In recent years, for a silent notification device of a mobile communication equipment and the like, or for other purposes, a vibration motor in which a vibrator portion vibrates vertically by an interaction of a coil and a magnet which are disposed in a radial direction, has been in use. In the vibration motor, as disclosed in US Patent Application Publication No. 2013/0082546, Japanese Patent Application Publication No. 2013-85438, etc., a flexible circuit board is connected to a coil in order to supply power to the coil included in the vibrator portion.

In the linear vibration motor disclosed in US Patent Application Publication No. 2013/0082546, as described in Paragraphs [0049] to [0054], a mounting portion 183 of a printed circuit board 180 is securely coupled to a case 100, and an elastic portion 185 is extended from the mounting portion 183 in a spiral form. A power applying portion 187 is formed at one end.

However, in the linear vibration motor of US Patent Application Publication No. 2013/0082546, the spiral elastic portion of the circuit board is deformed when the vibrator portion vibrates vertically. When the vibrator portion moves upwardly away from the mounting portion, a downward force is applied to the vibrator portion by the circuit board. Since there is only one elastic portion in the circuit board, the vibrator portion is pulled downward while being twisted in the direction which the elastic portion extends from the coil. When the twisting force rotating the vibrator portion about a horizontal axis is applied, the vibrator portion is tilted so that the vibrating movement of the vibrator portion may be inhibited.

SUMMARY OF THE INVENTION

A first exemplary preferred embodiment of the present disclosure is a vibration motor, which comprises a base portion which expands perpendicular to a vertical center axis, a magnet portion which is securely mounted on an upper side of the base portion in a vertical direction, a vibrator portion which is disposed around the magnet portion and vibrates vertically, a cover portion which is fixed to the base portion and covers upper and side portions of the magnet portion and the vibrator portion, an elastic member which is disposed between an upper inner surface of the cover portion and a top portion of the vibrator portion, and a circuit board which is flexible and fixed to an upper surface of the base portion and a lower portion of the vibrator portion. The vibrator portion includes a coil portion which faces the magnet portion in a radial direction, and a mass portion which is fixed to the coil portion. The base portion includes a base protrusion which protrudes outward from the cover portion in the radial direction. The circuit board includes a lower terminal portion which protrudes outward from between the cover portion and the base portion in the radial direction and is fixed to a top surface of the base protrusion, an upper terminal portion which is fixed to the lower portion of the vibrator portion and electrically connected to the coil portion, and two leg portions which extend from the lower terminal portion at an inner side of the cover portion toward both sides in a circumferential direction and are connected to the upper terminal portion from both sides in the circumferential direction.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 3:
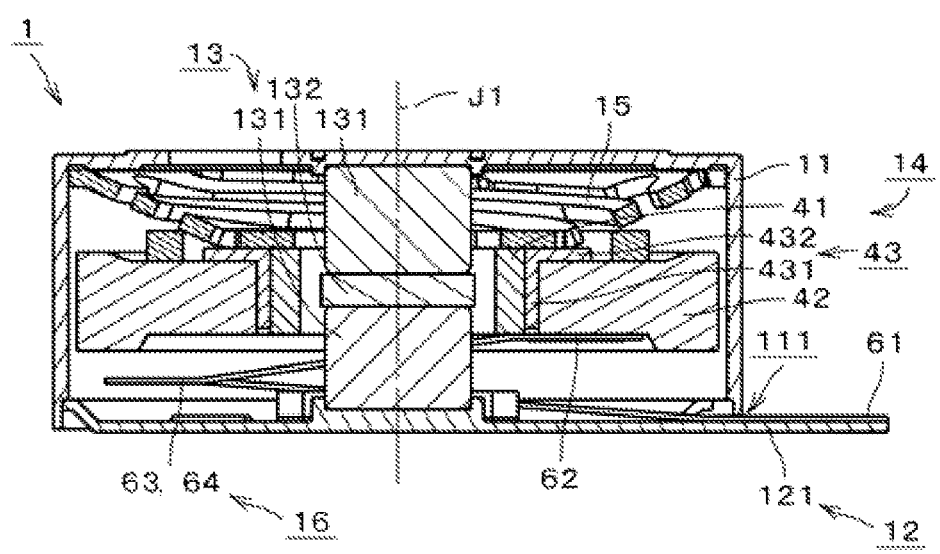
FIG. 3 is a vertical cross-sectional view of the vibration motor.

Herein, the upper side of FIG. 3 in the center axis J1 direction of the vibration motor 1 is referred to as "upper side" and the lower side thereof is referred to as "lower side". However, it will be understood that this definition of the upper and lower sides is not intended to limit the positional relations or directions when the vibration motor is actually assembled and installed to any equipment. Further, a direction parallel to the center axis J1 is referred to as "vertical direction", a radial direction having its center on the center axis J1 is referred to as "radial direction", and a circumferential direction having its center on the center axis J1 is referred to as "circumferential direction".

Figure 1:
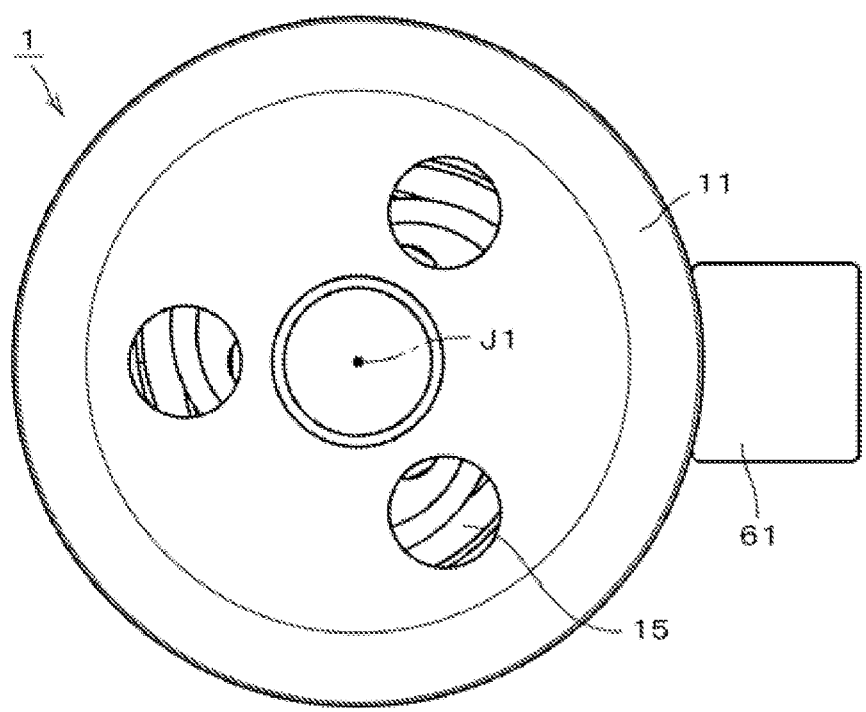
FIG. 1 is a top view of the vibration motor according to the first preferred embodiment.
Figure 2:
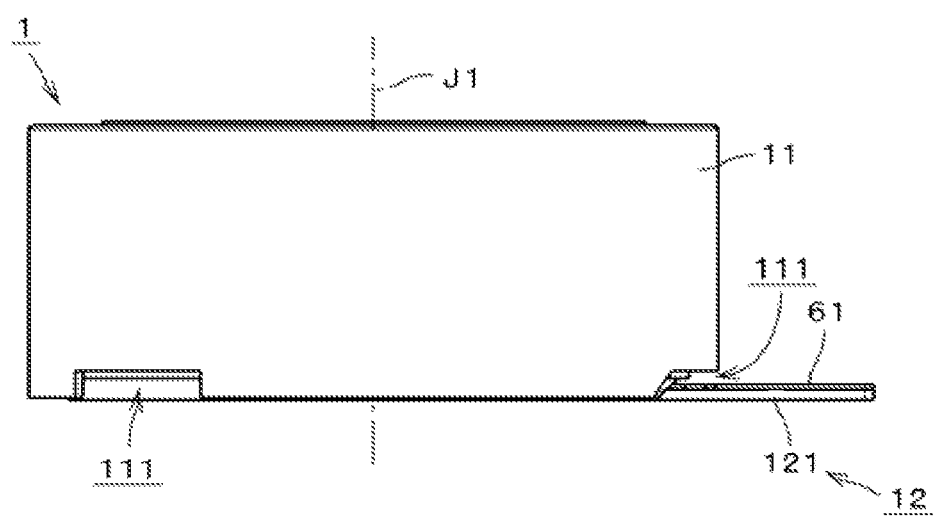
FIG. 2 is a side view of the vibration motor.
Figure 4:
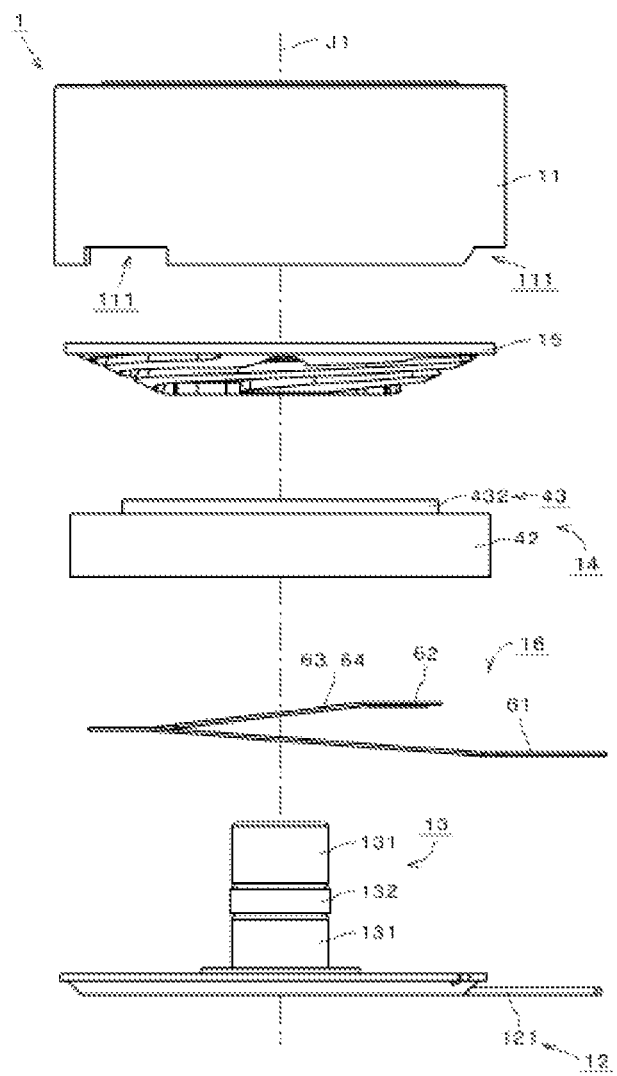
FIG. 4 is an exploded side view of the vibration motor.
Figure 5:
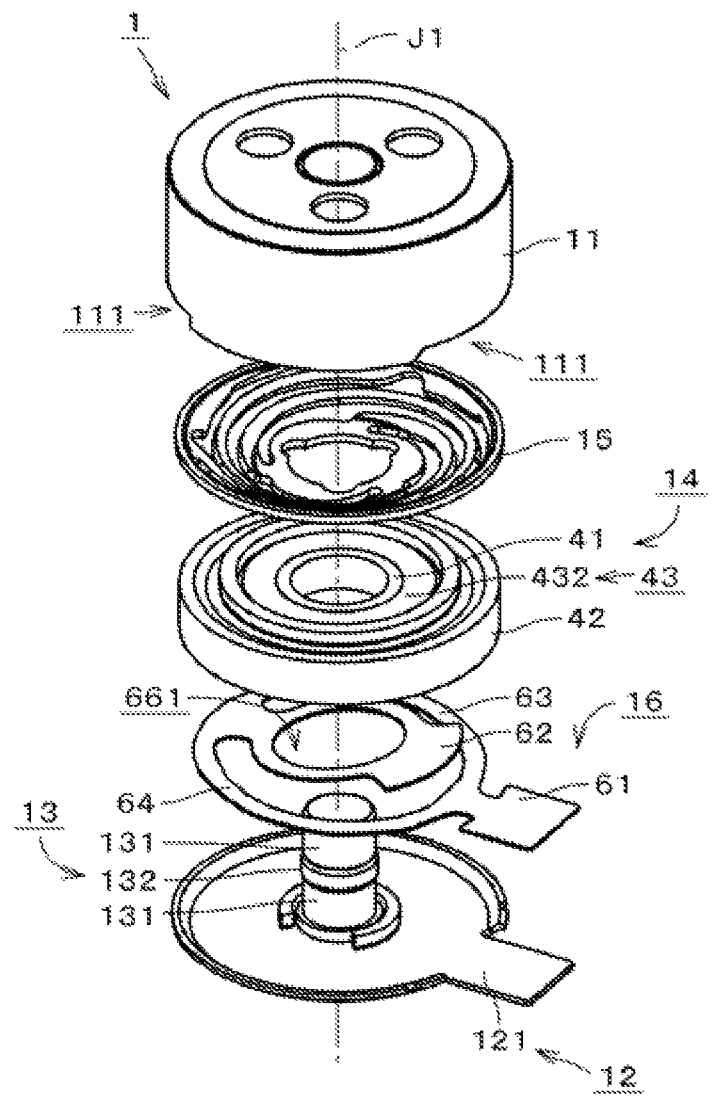
FIG. 5 is an exploded perspective view of the vibration motor.

FIG. 1 is a top view of a vibration motor according to the first exemplary preferred embodiment. FIG. 2 is a side view of the vibration motor 1. FIG. 3 is the vertical cross-sectional view of the vibration motor 1. FIG. 4 is an exploded side view of the vibration motor 1. FIG. 5 is an exploded perspective view of the vibration motor 1. In FIG. 3, a parallel diagonal line is omitted from the cross section details.

The vibration motor 1 is a Linear Resonant Actuator (LRA). The vibration motor 1 may be used as a silent notification device in mobile communication equipment, for example, a cellular phone, etc.

The vibration motor 1 includes a cover portion 11 and a base portion 12. The cover portion 11 has a substantially cylindrical shape with a lid. The base portion 12 spreads perpendicular to a vertical center axis J1. The cover portion 11 is fixed to the base portion 12. The base portion 12 closes an opening at a lower side of the cover portion 11. The cover portion 11 and the base portion 12 are made of metal. The cover portion 11 and the base portion 12 are connected by welding.

The base portion 12 includes a base protrusion 121 which extends in a substantially perpendicular direction to the center axis J1. The base protrusion 121 protrudes outward from the cover portion 11 in the radial direction. A plurality of grooves 111 which extend in the circumferential direction are provided at lower edges of the cover portion 111. The base protrusion 121 protrudes outward from a groove 111 in the radial direction. That is, a radially inner end portion of the base protrusion 121 is positioned inside the groove 111. By providing the plurality of grooves 111 in the cover portion 11, positions of the base protrusion 121 and the groove 111 can be easily aligned when the base portion 12 is fixed to the cover portion 11.

The vibration motor 1 includes a magnet portion 13, a vibrator portion 14, an elastic member 15, and a circuit board 16. The magnet portion 13 is a member of a substantially cylindrical shape having its center on the center axis J1. The magnet portion 13 is fixed to an upper side of the base portion 12 in a vertical direction. For example, a bottom portion of the magnet portion 13 is fixed to a top surface of the base portion 12 by an adhesive, etc. Otherwise, a top portion of the magnet portion 13 is fixed to a bottom surface of a canopy portion of the cover portion 11 by an adhesive, etc. The magnet portion 13 includes two magnets 131, and a pole piece 132. Each of the two magnets 131 is a member of a substantially cylindrical shape which extends in the vertical direction. The two magnets 131 are arranged in the vertical direction. The pole piece 132 is a member of a substantially disc shape or cylindrical shape, disposed between the two magnets 131. A top of the pole piece 132 is in contact with a bottom of the upper magnet 131, and a bottom of the pole piece 132 is in contact with a top of the lower magnet 131.

The vibrator portion 14 is a member of a substantially cylindrical shape which has its center on the center axis J1. The vibrator portion 14 is disposed around the magnet portion 13 over its entire circumference. An inner diameter of the vibrator portion 14 is bigger than an outer diameter of the magnet portion 13. The vibration 14 vibrates vertically along the magnet portion 13, without contacting the magnet portion 13. Upper and side portions of the magnet portion 13 and the vibrator portion 14 are covered by the cover portion 11.

The vibrator portion 14 includes a coil portion 41, a mass portion 42, and a yoke 43. The coil portion 41 is a member of a substantially cylindrical shape which has its center on the center axis J1. The coil portion 41 faces the magnet portion 13 in the radial direction. An inner circumferential surface of the coil portion 41 faces an outer circumferential surface of the magnet portion 13 in the radial direction with a gap therebetween.

The yoke 43 includes a cylinder portion 431, and a flange portion 432. The cylinder portion 431 has a substantially cylindrical shape which has its center on the center axis J1. The flange portion 431 has a substantially ring shape which has its center on the center axis J1. The flange portion 432 extends outward from an upper end portion of the cylinder portion 431 in the radial direction. The cylinder portion 431 and the flange portion 432 form a continuously connected member. The yoke 43 is disposed at a radially outer side of the coil portion 41. An inner circumferential surface of the cylinder portion 431 is fixed to an outer circumferential surface of the coil portion 41. The cylinder portion 431 is fixed to the coil portion 41 by, for example, an adhesive. The flange portion 432 may be extended outward from a lower end portion of the cylinder portion 431 in the radial direction. Also, the flange portion 432 is not necessarily required.

The mass portion 42 is a member of a substantially cylindrical shape which has its center on the center axis J1. The mass portion 42 is a so-called weight. The mass portion 42 is disposed at a radially outer side of the cylinder portion 431 of the yoke 43 and the coil portion 41. An inner circumferential surface of the mass portion 42 is fixed to an outer circumferential surface of the cylinder portion 431 of the yoke 43. A bottom surface of the flange portion 432 of the yoke 43 is in contact with a top surface of the mass portion 42. The mass portion 42 is fixed to the yoke 43 by, for example, an adhesive or a double-sided adhesive tape, or by press-fitting. The mass portion 42 is indirectly fixed to the coil portion 41 through the yoke 43.

The elastic member 15 is a member which is elastically deformable in the vertical direction when a vertical force is applied thereto. The elastic member 15 is made of, for example, a plate shape spring material wound in a spiral form. The elastic member 15 is a volute spring which has a contour of, for example, a truncated cone, and protrudes downward more and more as it goes toward its radially inner side. The elastic member 15 is disposed between an upper inner surface of the cover portion and an upper portion of the vibrator portion 14. A top portion of the elastic member 15 is fixed to the bottom surface of the canopy portion, which is the upper inner surface of the cover portion 11. The top portion of the elastic member 15 is fixed to the cover portion 11 by, for example, welding. A bottom portion of the elastic member 15 is fixed to the vibrator portion 14. The bottom portion of the elastic member 15 is fixed to the top surface of the mass portion 42 by, for example, welding.

The circuit board 16 supplies current from a power source to the coil portion 41. The circuit board 16 is a Flexible Printed Circuit (FPC), which has flexibility. The circuit board 16 is a relatively thin and soft member. The circuit board 16 is disposed between the base portion 12 and the vibrator portion 14, and fixed to the top surface of the base portion 12 and the bottom surface of the vibrator portion 14. The circuit board 16 is fixed to the base portion 12 and the vibrator portion 14 by, for example, an adhesive.

In the vibration motor 1, when current is supplied to the coil portion 41 through the circuit board 16, a magnetic field is formed in the coil portion 41 and the yoke 43. By this magnetic field and a magnetic field of the magnet portion 13, a force to move the vibrator portion 14 in the vertical direction is generated. Since the vibrator portion 14 is supported by the elastic member 15 in the vertical direction, it vibrates vertically by the force received from the magnetic field and the restoring force of the elastic member 15.

Figure 6:
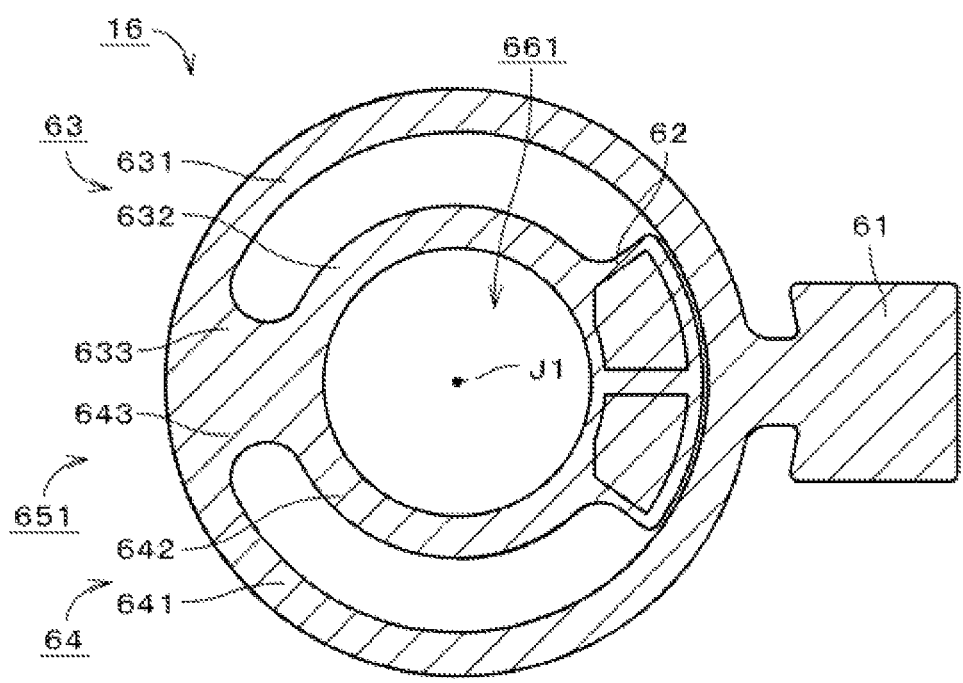
FIG. 6 is a top view of the circuit board.
Figure 7:
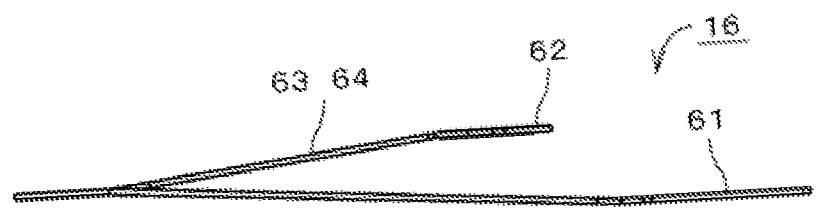
FIG. 7 is a side view of the circuit board.
Figure 8:
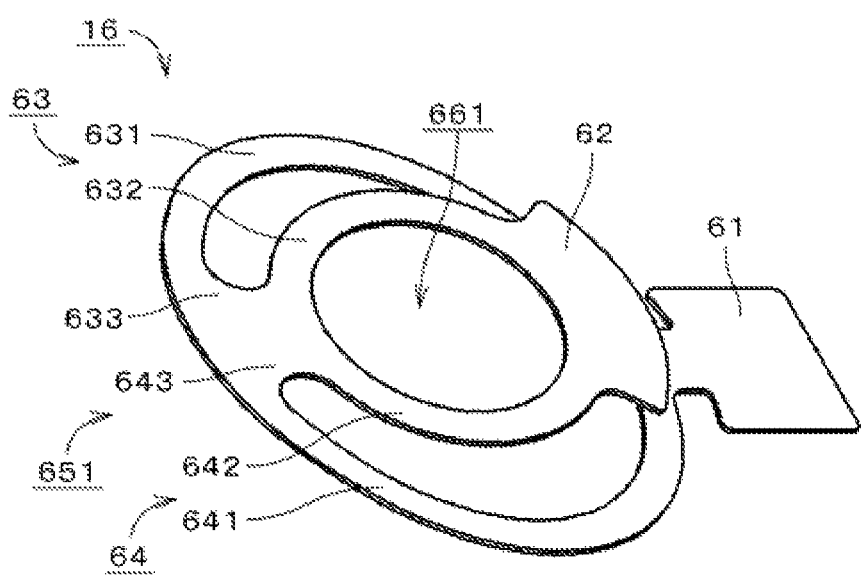
FIG. 8 is a perspective view of the circuit board.

FIG. 6 is a top view of the circuit board 16. In FIG. 6, a parallel diagonal line is added to the circuit board 16 for a better understanding of the shape of the circuit board 16. The same is also applied to FIG. 11 to FIG. 15. FIG. 7 is a side view of the circuit board 16. FIG. 8 is a perspective view of the circuit board 16. The circuit board 16 includes a lower terminal portion 61, an upper terminal portion 62, and two leg portions 63, 64. Hereinafter, the leg portion 63 and the leg portion 64 will be respectively referred to as "first leg portion 63" and "second leg portion 64". That is, the two leg portions 63, 64 include the first leg portion 63 and the second leg portion 64.

As shown in FIG. 2 and FIG. 3, the lower terminal portion 61 protrudes from between the cover portion 11 and the base portion 12 toward the outside in the radial direction of the cover portion 11. The lower terminal portion 61 is fixed to a top surface of the base protrusion 121. The lower terminal portion 61 is electrically connected to a power source which is not illustrated in the drawings. As shown in FIG. 3, the upper terminal portion 62 is fixed to a lower portion of the vibrator portion 14. The upper terminal portion 62 is fixed to, for example, a bottom surface of the mass portion 42 by an adhesive, etc. The upper terminal portion 62 is electrically connected to the coil portion 41. The first leg portion 63 and the second leg portion 64 slantingly extend upward from the lower terminal portion 61 inside the cover portion 11, and are connected to the upper terminal portion 62. The lower terminal portion 61, the two leg portions 63, 64 and the upper terminal portion 62 form a continuously connected member.

As shown in FIG. 6 to FIG. 8, the two leg portions 63, 64 extend from the lower terminal portion 61 to both sides in the circumferential direction, and are connected to the upper terminal portion 62 from both sides in the circumferential direction. The first leg portion 63 includes a first outer circumferential leg portion 631, a first inner circumferential leg portion 632, and a first return portion 633. The first outer circumferential leg portion 631 extends from the lower terminal portion 61 to the first return portion 633 in one circumferential direction. The first inner circumferential leg portion 632 is reversely bent at the first return portion 633 from the first outer circumferential leg portion 631. The first inner circumferential leg portion 632 extends from the first return portion 633 to the upper terminal portion 62 in the other circumferential direction, at a radially inner side of the first outer circumferential leg portion 631. In FIG. 6, the one circumferential direction is a counterclockwise direction, and the other circumferential direction is a clockwise direction.

The second leg portion 64 includes a second outer circumferential leg portion 641, a second inner circumferential leg portion 642, and a second return portion 643. The second outer circumferential leg portion 641 extends from the lower terminal portion 61 to the second return portion 643 in the other circumferential direction, that is, in the clockwise direction. The second inner circumferential leg portion 642 is reversely bent at the second return portion 643 from the second outer circumferential leg portion 641. The second inner circumferential leg portion 642 extends from the second return portion 643 to the upper terminal portion 62 in the one circumferential direction, that is, in the counterclockwise direction, at a radially inner side of the second outer circumferential leg portion 641.

The upper terminal portion 62 is disposed at a radially inner side of the lower terminal portion 61. That is, the upper terminal portion 62 and the lower terminal portion 61 are disposed at the same circumferential position, and face each other in the radial direction. The two leg portions 63, 64 have plane symmetry with respect to the plane which includes the center axis J1, and a circumferential center of the base protrusion 121 (see FIG. 5). As shown in FIG. 5, the outer contour of the base protrusion 121 and that of the lower terminal portion of the circuit board 16 are substantially the same. For this reason, the two leg portions 63, 64 also have plane symmetry with respect to the plane which includes the center axis J1, and a circumferential center of the lower terminal portion 61.

As shown in FIG. 6 and FIG. 8, the first return portion 633 of the first leg portion 63 and the second return portion 643 of the second leg portion 64 are connected to each other in the circumferential direction. That is, the first return portion 633 and the second return portion 643 respectively form a portion of a common return portion. Accordingly, a substantially circular opening 661 having its center on the center axis J1 is provided at a center portion of the circuit board 16. The opening 661 is surrounded by the first inner circumferential leg portion 632, the first return portion 633, the second return portion 643, the second inner circumferential leg portion 642 and the upper terminal portion 62. The first inner circumferential leg portion 632, the first return portion 633, the second return portion 643 and the second inner circumferential leg portion 642 are collectively referred to as "center opening portion 651." Together with the upper terminal portion 62, the center opening portion 651 forms the opening 661. The two leg portions 63, 64 include the center opening portion which has a substantially C shape. As shown in FIG. 5, the magnet portion 13 is disposed at the substantial center of the opening 661 of the circuit board 16. That is, the center opening portion 651 shown in FIG. 6 and FIG. 8 is a member having its center on the magnet portion 13.

Figure 9:
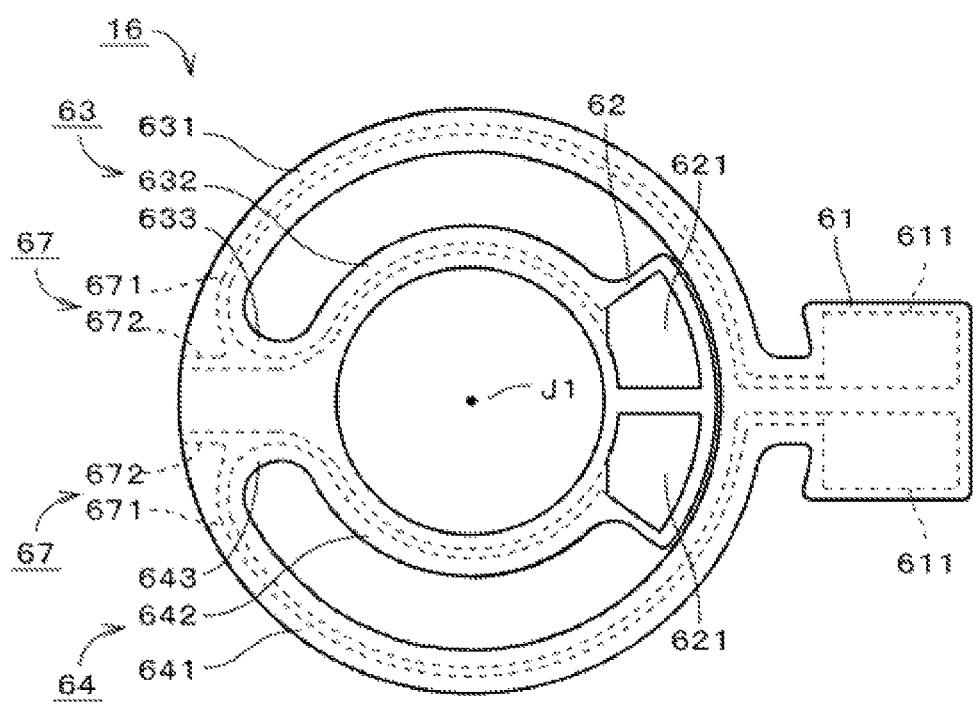
FIG. 9 is a top view of the circuit board.

FIG. 9 is a top view of the circuit board 16. The lower terminal portion 61 includes two lower terminals 611. The upper terminal portion 62 includes two upper terminals 621. Each of the two leg portions 63, 64 has a wiring 67 which electrically connects the lower terminal portion 61 and the upper terminal portion 62. Each wiring 67 of the two leg portions 63, 64 includes a main wiring 671, and a branch wiring 672. The main wiring 671 connects the lower terminal portion 61 and the upper terminal portion 62. Specifically, the main wiring 671 of the first leg portion 63 starts from the lower terminal 611 shown on the upper side of FIG. 9, and passes through the first outer circumferential leg portion 631, the first return portion 633 and the first inner circumferential leg portion 632. Then, it reaches the upper terminal 621 shown on the upper side of FIG. 9. The main wiring 671 of the second leg portion 64 starts from the lower terminal 611 shown on the lower side of FIG. 9, and passes through the second outer circumferential leg portion 641, the second return portion 643 and the second inner circumferential leg portion 642, and then reaches the upper terminal 621 shown on the lower side of FIG. 9.

The branch wiring 672 of the first leg portion 63 is branched out from the main wiring 671 at the first return portion 633 and led to an outer circumferential edge of the circuit board 16. The branch wiring 672 of the second leg portion 64 is branched out from the main wiring 671 of the second return portion 643, and led to an outer circumferential edge of the circuit board 16. In the example shown in FIG. 9, the two branch wirings 672 are led to an outer circumferential edge of the circuit board 16 at an opposite side from the lower terminal portion 61, with the center axis J1 interposed therebetween.

In the vibration motor 1 shown in FIG. 1 to FIG. 5, when the vibrator portion 14 vibrates vertically, the circuit board 16 is deformed in accordance with the vibrator portion 14. When the vibrator portion 14 moves upward, that is, in a direction away from the base portion 12, a downward force is applied to the vibrator portion 14 by the circuit board 16. As described above, the circuit board 16 includes the two leg portions 63, 64 which extend from the lower terminal portion 61 to both sides in the circumferential direction, and are connected to the upper terminal portion 62 from both sides in the circumferential direction. For this reason, the portion of the vibrator portion 14 where the upper terminal portion 62 is fixed to is pulled downward from both sides in the circumferential direction. Accordingly, comparing to a case where only one leg portion is employed, it is possible to suppress a twisting force, which may rotate the vibrator portion about a transverse axis perpendicular to the vertical direction, from being applied to the vibrator portion 14 by the circuit board 16 portion. As a result, the vibrator portion 14 can be configured to move smoothly in the vertical direction.

The two leg portions 63, 64 have plane symmetry with respect to a plane which includes the center axis J1, and a circumferential center of the base protrusion 121. Accordingly, forces applied to the vibrator portion 14 by the circuit board 16 also have substantial plane symmetry with respect to the same plane. As a result, it is possible to suppress a twisting force from being applied to the vibrator portion 14 by the circuit board.

As shown in FIG. 6 and FIG. 8, in the first leg portion 63, the first outer circumferential leg portion 631 extends from the lower terminal portion 61 in the one circumferential direction. Also, the first inner circumferential leg portion 632 is reversely bent at the first return portion 633 from the first outer circumferential leg portion 631, and extends from a radially inner side of the first outer circumferential leg portion 631 in the other circumferential direction. Likewise, in the second leg portion 64, the second outer circumferential leg portion 641 extends from the lower terminal portion 61 in the other circumferential direction. Also, the second inner circumferential leg portion 642 is reversely bend at the second return portion 643 from the second outer circumferential leg portion 641, and extends from a radially inner side of the second outer circumferential leg portion 641 in the one circumferential direction.

Accordingly, it is possible to lengthen the first leg portion 63 and second leg portion 64 while suppressing an increase in size of the circuit board 16 in the radial direction. For this reason, the circuit board 16 can be relatively largely deformed in the vertical direction. As a result, it is possible to suppress or prevent vertical vibration of the vibrator portion 14 from being inhibited by the circuit board 16. It is also possible to reduce the force applied to the vibrator portion 14 by the circuit board 16 when the vibrator portion 14 moves upward. Accordingly, it is possible to configure the vibrator portion 14 to move smoothly in the vertical direction.

Also, in the circuit board 16, the upper terminal portion 62 is disposed at a radially inner side of the lower terminal portion 61. Accordingly, the first leg portion 63 and the second leg portion 64 can be lengthened even more. As a result, it is possible to configure the vibrator portion 14 to move more smoothly in the vertical direction.

The two leg portions 63, 64 include a C-shaped center opening portion 651 which has its center on the magnet portion 13. When assembling the vibration motor 1, the magnet portion 13 is inserted into the opening 661 which is provided at a radially inner side of the center opening portion 651. Accordingly, the circuit board 16 can be easily positioned with respect to the magnet portion 13 when assembling the vibration motor 1.

The center opening portion 651 may have a substantially ring shape having its center on the magnet portion 13. In such case, the upper terminal portion 62, for example, protrudes outward in the radial direction from the substantially ring-shaped center opening portion 651. When assembling the vibration motor 1, the magnet portion 13 is inserted into the opening 661 which is provided at a radially inner side of the substantially ring-shaped center opening portion 651. With this constitution of the two leg portions 63, 64 including the ring-shaped center opening portion 651 having its center on the magnet portion 13, the circuit board 16 can be likewise easily positioned with respect to the magnet portion 13 when assembling the vibration motor.

When assembling the vibration motor 1 illustrated in FIG. 1 to FIG. 5, for example, the lower terminal portion 61 of the circuit board 16 is fixed to the base protrusion 121 after the upper terminal portion 62 of the circuit board 16 has been coupled to the vibrator portion 14. As previously described, the two leg portions 63, 64 of the circuit board 16 extend from the lower terminal portion 61 to both sides in the circumferential direction, and are connected to the upper terminal portion 62 from both sides in the circumferential direction. For this reason, comparing to a case where only one leg portion is employed, the movement of the lower terminal portion 61 in the circumferential direction in the circuit board 16 which is coupled to the vibrator portion 14 is suppressed. As a result, dislocation of the lower terminal portion 61 in the circumferential direction can be suppressed when the lower terminal portion 61 is fixed to the base protrusion 121.

As shown in FIG. 9, each of the two leg portions 63, has a wiring 67 which electrically connects the lower terminal portion 61 and the upper terminal portion 62. Accordingly, the width of each of the two leg portions 63, 64 can be inhibited from becoming wider. As a result, a radial increase in size of the circuit board 16 can be suppressed. The width of each of the leg portions 63, 64 is, for example, about 0.5 mm.

Figure 10:
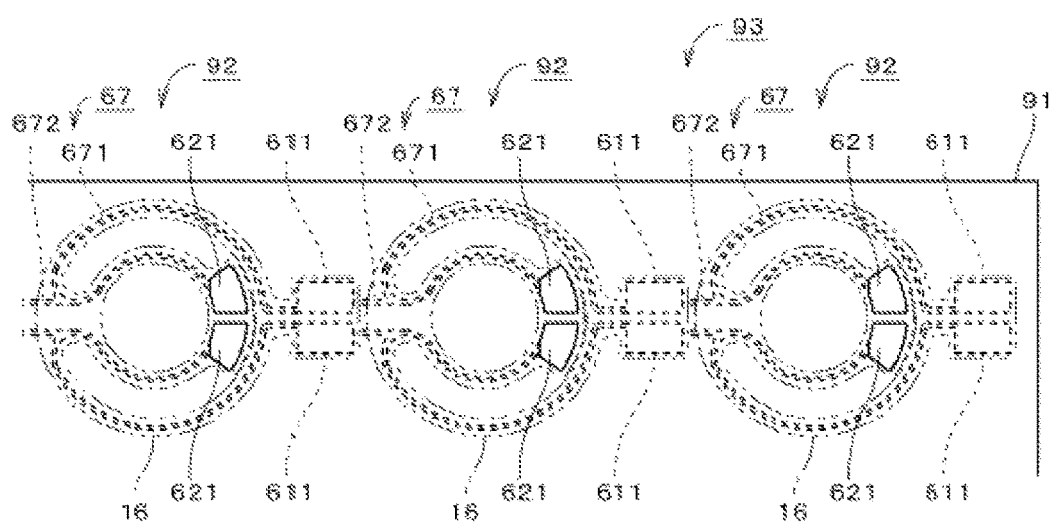
FIG. 10 is a top view which illustrates a portion of the original plate for forming the circuit board.

In the manufacturing of the vibration motor 1, a plurality of circuit boards 16 are formed from one sheet of an original plate by puncturing holes thereto. FIG. 10 is a top view which illustrates a portion of an original plate 91 used for forming the circuit board 16. A continuous circuit 93, which is formed of a sequence of a plurality of circuit elements 92, is provided to the original plate 91. Each circuit element 92 is a predetermined portion where the wiring 67 of the circuit board 16, the lower terminal 611 and the upper terminal 621 are to be provided.

In FIG. 10, the continuous circuit 93 is illustrated with a thick broken line and a solid line, and the outline of the circuit board 16 is illustrated with a two-dot chain line. In FIG. 10, identical reference number is designated to each circuit element 92 that is to become the portion for the wiring 67, the lower terminal 611 and the upper terminal 621, etc. In the following descriptions, the portions where the wiring 67, the lower terminal 611 and the upper terminal 621 are to be provided will be simply referred to as the wiring 67, the lower terminal 611 and the upper terminal 621. In the continuous circuit 93, the branch wiring 672 of one circuit element 92 is connected to the main wiring 671 through the lower terminal 611 of the adjacent circuit element 92.

In the manufacturing of the vibration motor 1, an electrical conductivity test is conducted on each wiring 67 in advance to the step of puncturing holes in the original plate 91 to form the circuit board 16. As previously described, each wiring 67 includes the main wiring 671 and the branch wiring 672, and the plurality of wirings 67 are connected by the branch wiring 672. For this reason, it is possible to arrange and conduct the conductivity test on the plurality of wirings 67. Accordingly, the manufacturing of the circuit board 16 can be simplified. In the conductivity test or the like, an electrode terminal gets in contact with the branch wiring 672. Accordingly, it is possible to prevent the main wiring 671, which is used for supplying current to the upper terminal portion 62 when used as the circuit board 16, from being damaged by the contact of the electrode terminal.

FIG. 11 to FIG. 15 are top views of other preferred circuit boards 16a, 16b, 16c, 16d and 16e. In the following descriptions of the circuit boards 16a~16e, identical shapes and structures of the circuit board 16 are employed, unless otherwise mentioned in detail.

Figure 11:
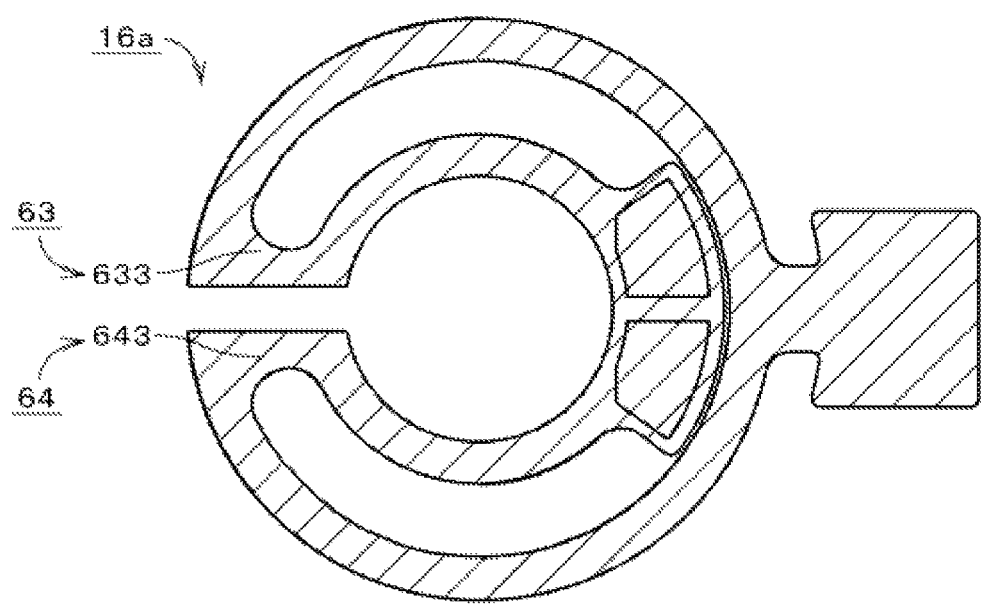
FIG. 11 is a top view of another circuit board.

In the circuit board 16a illustrated in FIG. 11, the first return portion 633 and the second return portion 643 are spaced apart in the circumferential direction. Accordingly, as shown in FIG. 6, the rigidity of each of the first return portion 633 and the second return portion 643 can be made smaller, comparing to the case where the first return portion 633 and the second return portion 643 are connected in the circumferential direction. For this reason, the first leg portion 63 and the second leg portion 64 can respectively be easily deformed in the vertical direction. As a result, the vibrator portion 14 can be configured to move more smoothly in the vertical direction.

Figure 12:
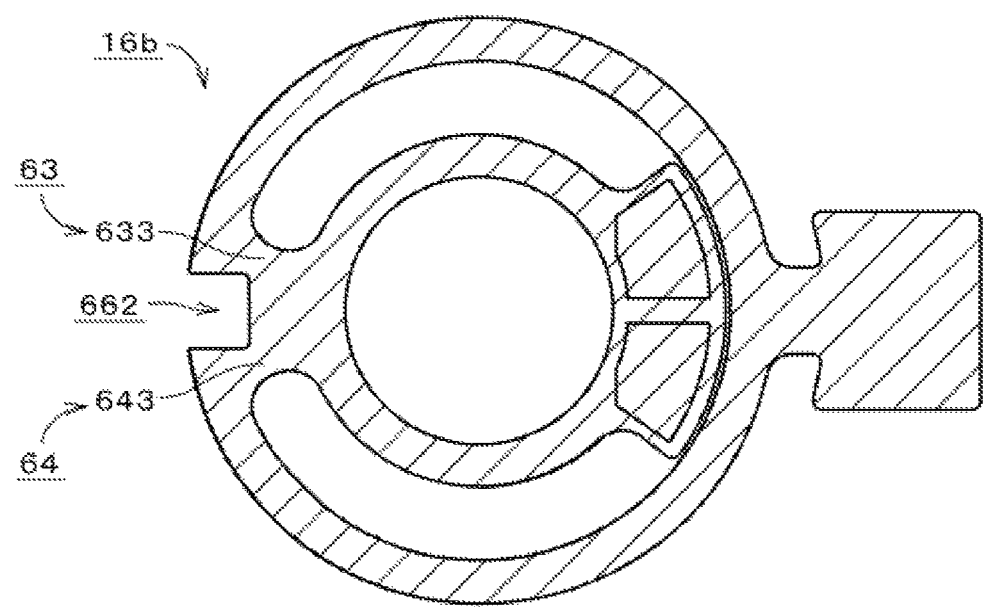
FIG. 12 is a top view of another circuit board.
Figure 13:
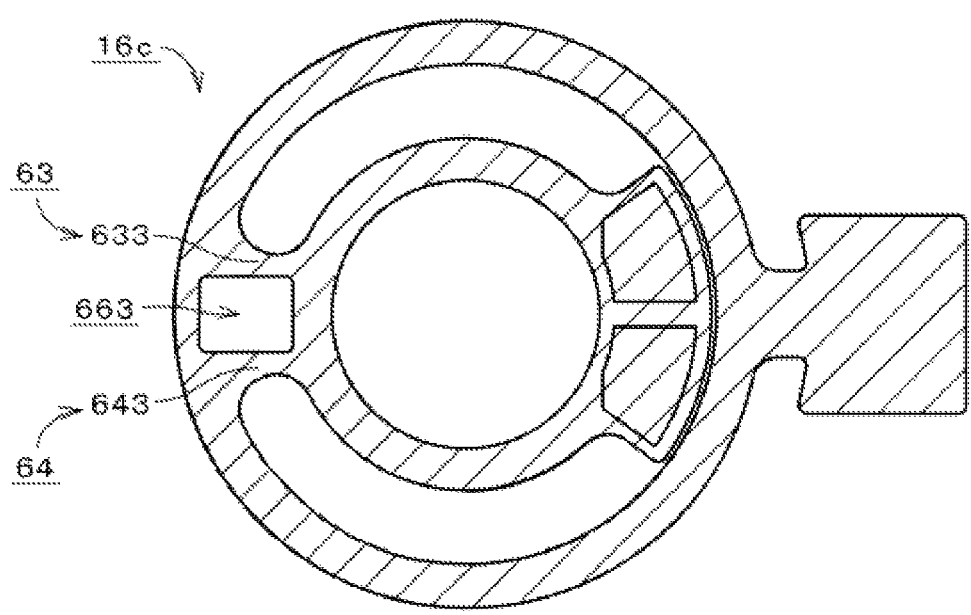
FIG. 13 is a top view of another circuit board.

In the circuit boards 16b, 16c which are illustrated in FIG. 12 and FIG. 13, a portion of the first return portion 633 and a portion of the second return portion 643 are connected in the circumferential direction. That is, the first return portion 633 and the second return portion 643 are only partially connected in the radial direction.

In the circuit board 16b illustrated in FIG. 12, a radially inner portion of the first return portion 633 is connected to a radially inner portion of the second return portion 643. A radially outer portion of the first return portion 633 is not connected to the second return portion 643, and a radially outer portion of the second return portion 643 is not connected to the first return portion 633. When the first return portion 633 and the second return portion 643 are integrally referred to as "common return portion", a groove 662 is provided at a radially outer portion of the common return portion. Accordingly, the rigidity of each of the first return portion 633 and the second return portion 643 can be made smaller. For this reason, the first leg portion 63 and the second leg portion 64 can respectively be easily deformed in the vertical direction. As a result, the vibrator portion 14 can be configured to move more smoothly in the vertical direction.

In the circuit board 16c illustrated in FIG. 13, radially inner and outer portions of the first return portion 633 is connected to radially inner and outer portions of the second return portion 643, respectively. A radially central portion of the first return portion 633 is not connected to the second return portion 643, and a radially central portion of the second return portion 643 is not connected to the first return portion 633. That is, an opening 663 is provided at the center portion of the common return portion. Accordingly, the rigidity of each of the first return portion 633 and the second return portion 643 can be made smaller. For this reason, the first leg portion 63 and the second leg portion 64 can respectively be easily deformed in the vertical direction. As a result, the vibrator portion 14 can be configured to move more smoothly in the vertical direction.

Figure 14:
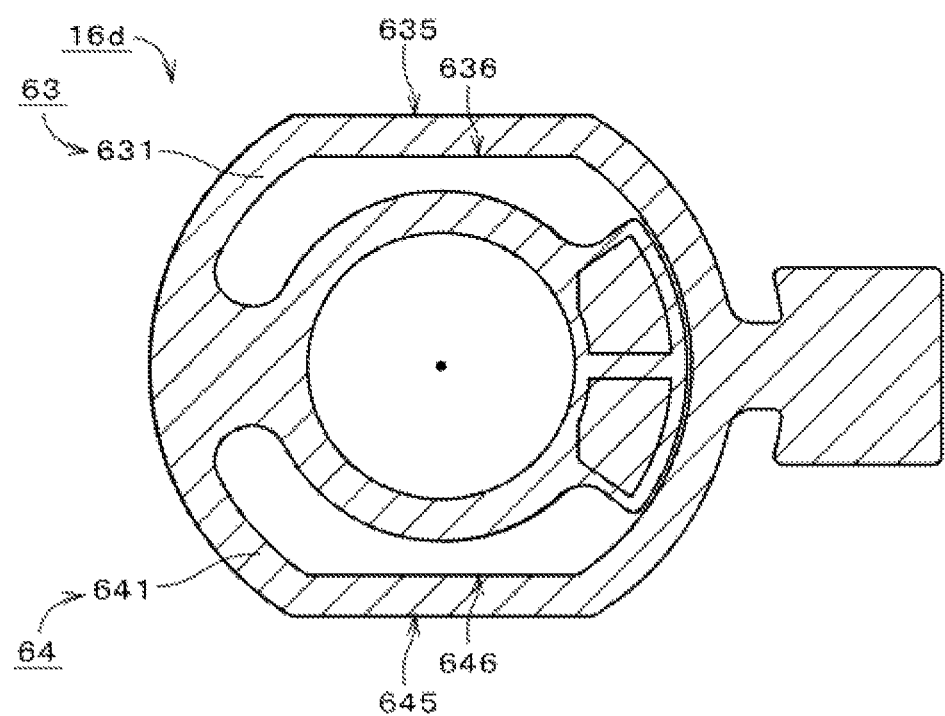
FIG. 14 is a top view of another circuit board.

In the circuit board 16d illustrated in FIG. 14, outer edges of the two leg portions 63, 64, that is, an outer edge of the first outer circumferential leg portion 631 and an outer edge of the second outer circumferential leg portion 641 respectively include two linear portions 635, 645 having plane symmetry with respect to a plane which includes the center axis J1, and the circumferential center of the base protrusion 121. The two linear portions 635, 645 also have plane symmetry with respect to a plane which includes the center axis J1, and the circumferential center of the lower terminal portion 61. Accordingly, the width of the circuit board 16d, which corresponds to a distance between the linear portion 635 and the linear portion 636, can be made smaller. By minimizing the circuit board 16d, the number of circuit boards 16d formed from a one sheet of an original plate 91 can be increased when the circuit board 16d is formed by puncturing the original plate 91. Also in the circuit board 16d, an inner edge of the first outer circumferential leg portion 631 and an inner edge of the second outer circumferential leg portion 641 respectively include two linear portions 636, 646 having plane symmetry with respect to a plane which includes the center axis J1, and the circumferential center of the base protrusion 121.

Figure 15:
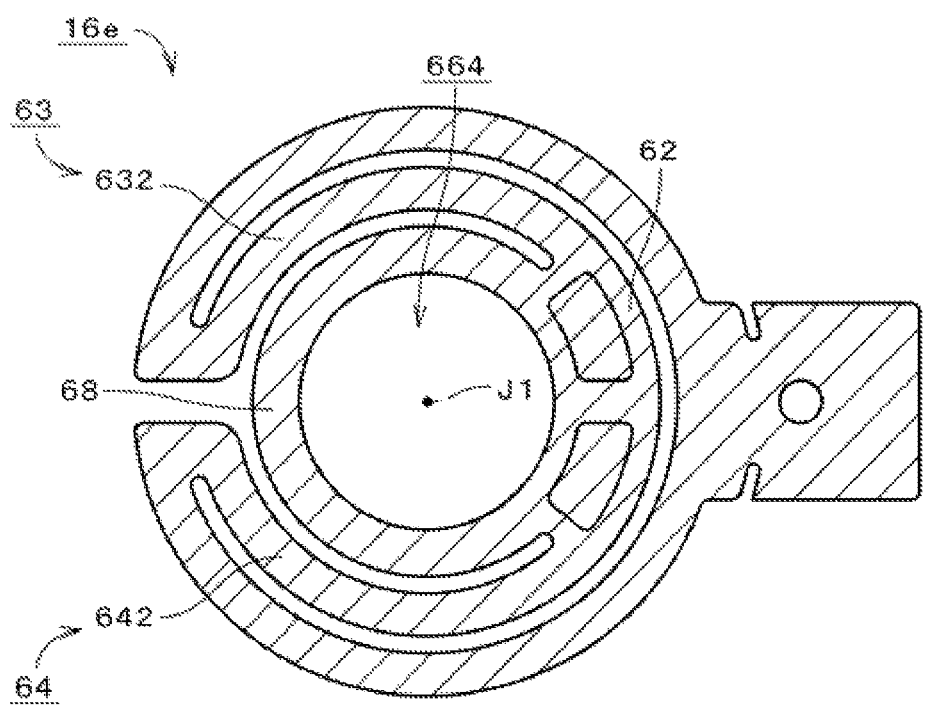
FIG. 15 is a top view of another circuit board.

The circuit board 16e illustrated in FIG. 15 also includes an upper fixing portion 68. The upper fixing portion 68 extends from the upper terminal portion 62 to both sides in the circumferential direction. The upper fixing portion 68 is disposed at a radially inner side of the first inner circumferential leg portion 632 and the second inner circumferential leg portion 642. In the example shown in FIG. 15, the upper fixing portion 68 has a substantially C shape, and forms a substantially circular opening 664 having its center on the center axis J1, in cooperation with the upper terminal portion 62. The magnet portion 13 is disposed at the substantial center of the opening 664 of the circuit board 16e. The upper fixing portion 68 is fixed to a lower portion of the vibrator portion 14 around the magnet portion 13. By fixing the upper fixing portion 68 to the vibrator portion 14 as well as the upper terminal portion 62, the circuit board 16e and the vibrator portion 14 can be securely fixed. In the circuit board 16e, for example, the entire top surface of the upper fixing portion 68 is fixed to the bottom surface of the vibrator portion 14 by an adhesive, etc.

A variety of modification is possible for the vibration motor 1.

For example, the first return portion 633 and the second return portion 643 may not be provided to the circuit board 16. Also, the upper terminal portion 62 may not necessarily be disposed at a radially inner side of the lower terminal portion 61. The upper terminal portion 62 may be disposed, for example, at an opposite side from the lower terminal portion 61, with the center axis J1 interposed therebetween. In this case, each of the first leg portion 63 and the second leg portion 64 extends from the lower terminal portion 61 to the upper terminal portion 62 for only about 180 degrees in the circumferential direction. The same configuration can be substantially applied to circuit boards 16a~16e.

In circuit boards 16, 16a~16e, the two wirings 67 may be provided to either one side of the two leg portions 63, 64.

In circuit boards 16, 16a~16e, the two upper terminals 621 may not necessarily be provided to one upper terminal portion 62. For example, a terminal portion having one upper terminal 621 may be provided at a front end of the first leg portion 63, and another terminal portion which has another upper terminal 621 and is adjacent to the terminal portion may be provided to a front end of the second leg portion 64. In this case, the upper terminal portion 62 includes the two terminal portions.

The shape and configuration of the magnet portion 13, the vibrator portion 14 and the elastic member 15 may be appropriately modified. For example, the yoke 43 may be omitted from the vibrator portion 14, and the coil portion 41 may directly be connected to the inner circumferential surface of the mass portion 42.

The installation or fixation of each member in the vibration motor may be indirect. For example, when circuit boards 16, 16a~16e are coupled to the base portion 12, another member may be interposed between the circuit boards 16, 16a~16e and the base portion 12. Another member may also be interposed when the magnet portion 13 is coupled to the cover portion 11 or the base portion 11, and when the cover portion 11 and the base portion 12 are coupled.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vibration motor, comprising:
   a base portion which expands perpendicular to a vertical center axis;
   a magnet portion which is securely mounted on an upper side of the base portion in a vertical direction;
   a vibrator portion which is disposed around the magnet portion and vibrates vertically;
   a cover portion which covers upper and side portions of the magnet portion and the vibrator portion, and is fixed to the base portion;
   an elastic member which is disposed between an upper inner surface of the cover portion and a top portion of the vibrator portion; and
   a circuit board which is flexible and fixed to a top surface of the base portion and a bottom portion of the vibrator portion,
   wherein the vibrator portion includes:
   a coil portion which faces the magnet portion in a circumferential direction; and
   a mass portion fixed to the coil portion,
   the base portion includes:
       a base protrusion which protrudes from the cover portion to a radially outer side, and
   the circuit board includes:
   a lower terminal portion which protrudes outward from between the cover portion and the base portion in a radial direction and is fixed to a top surface of the base protrusion;
   an upper terminal portion which is fixed to the lower portion of the vibrator portion, and electrically connected to the coil portion; and
   two leg portions which extend from the lower terminal portion to both sides in the circumferential direction inside the cover portion, and are connected to the upper terminal portion from both sides in the circumferential direction.

2. The vibration motor according to claim 1,
   wherein the two leg portions have plane symmetry with respect to a plane which include the center axis, and a circumferential center of the base protrusion.

3. The vibration motor according to claim 1,
   wherein the two leg portions include:
   a first leg portion; and
   a second leg portion,
   the first leg portion includes:
   a first outer circumferential leg portion which extends from the lower terminal portion to one circumferential direction; and
   a first inner circumferential leg portion which is reversely bent from the first outer circumferential leg portion at a first return portion and extends from a radially inner side of the first outer circumferential leg portion to the other circumferential direction, and
   the second leg portion includes:
   a second outer circumferential leg portion which extends from the lower terminal portion to the other circumferential direction; and
   a second inner circumferential leg portion which is reversely bent from the second outer circumferential leg portion at a second return portion, and extends from a radially inner side of the second outer circumferential leg portion to the one circumferential direction.

4. The vibration motor according to claim 2,
   wherein the two leg portions include:
   a first leg portion; and
   a second leg portion,
   the first leg portion includes:
   a first outer circumferential leg portion which extends from the lower terminal portion to one circumferential direction; and
   a first inner circumferential leg portion which is reversely bent from the first outer circumferential leg portion at a first return portion, and extends from a radially inner side of the outer circumferential leg portion to the other circumferential direction, and
   the second leg portion includes:
   a second outer circumferential leg portion which extends from the lower terminal portion in the other circumferential direction; and
   a second inner circumferential leg portion which is reversely bent from the second outer terminal portion at a second return portion, and extends from a radially inner side of the second outer circumferential leg portion to the one circumferential direction.

5. The vibration motor according to claim 3,
   wherein the upper terminal portion is disposed at a radially inner side of the lower terminal portion.

6. The vibration motor according to claim 4,
   wherein the upper terminal portion is disposed at a radially inner side of the lower terminal portion.

7. The vibration motor according to claim 4,
   wherein the first return portion and the second return portion are spaced apart in the circumferential direction.

8. The vibration motor according to claim 6,
   wherein the first return portion and the second return portion are spaced apart in the circumferential direction.

9. The vibration motor according to claim 4,
   wherein a portion of the first return portion and a portion of the second return portion are connected in the circumferential direction.

10. The vibration motor according to claim 6,
    wherein a portion of the first return portion and a portion of the second return portion are connected in the circumferential direction.

11. The vibration motor according to claim 2,
    wherein the two leg portions include a center opening which has a ring shape or a C shape, having its center on the magnet portion.

12. The vibration motor according to claim 4,
    wherein the two leg portions include a center opening which has a ring shape or a C shape, having its center on the magnet portion.

13. The vibration motor according to claim 5,
    wherein the two leg portions include a center opening which has a ring shape or a C shape, having its center on the magnet portion.

14. The vibration motor according to claim 8,
    wherein the two leg portions include a center opening which has a ring shape or a C shape, having its center on the magnet portion.

15. The vibration motor according to claim 10,
wherein the two leg portions include a center opening which has a ring shape or a C shape, having its center on the magnet portion.

16. The vibration motor according to claim 6,
wherein the circuit board further includes an upper fixing portion which extends from the upper terminal portion to both sides in the circumferential direction, and is fixed to the lower portion of the vibrator portion around the magnet portion.

17. The vibration motor according to claim 6,
wherein outer edges of the two leg portions respectively includes two linear portions having plane symmetry with respect to a plane which includes the center axis and the circumferential center of the base protrusion.

18. The vibration motor according to claim 13,
wherein each of the two leg portions includes a wiring which electrically connects the lower terminal portion and the upper terminal portion.

19. The vibration motor according to claim 3,
wherein each of the wirings of the two leg portions include:

a main wiring which connects the lower terminal portion and the upper terminal portion; and
a branch wiring which is branched out from the main wiring and led to an outer edge of the circuit board.

20. The vibration motor according to claim 13,
wherein the circuit board further includes an upper fixing portion which extends from the upper terminal portion to both sides in the circumferential direction, and is fixed to the bottom portion of the vibrator portion which is disposed around the magnet portion,
outer edges of the two leg portions respectively includes two linear portions having plane symmetry with respect to a plane which includes the center axis and the circumferential center of the base protrusion,
each of the two leg portions includes a wiring which electrically connects the lower terminal portion and the upper terminal portion, and
each of the wirings of the two leg portions includes:
a main wiring which connects the lower terminal portion and the upper terminal portion; and
a branch wiring which is branched out from the main wiring and led to an outer edge of the circuit board.

\* \* \* \* \*